April 30, 1957  P. C. CAMERON  2,790,910
ANTI-GLARE DEVICES
Filed May 7, 1953

INVENTOR.
PETER C. CAMERON
BY
ATTORNEY

United States Patent Office 2,790,910
Patented Apr. 30, 1957

2,790,910

ANTI-GLARE DEVICES

Peter C. Cameron, Bethesda, Md., assignor of one-tenth to Richard P. Schulze, Bethesda, Md.

Application May 7, 1953, Serial No. 353,611

1 Claim. (Cl. 250—71)

This invention relates to improvements in anti-glare apparatus and methods and is concerned particularly with eyeglasses or other devices for direct association with the eyes of a vehicle operator.

It is well known that the headlight glare of approaching vehicles encountered during night time driving is a source of great annoyance and danger to vehicle operators and many attempts have heretofore been made in an effort to solve this problem. Such prior efforts have not been successful generally because they have not actually effected adequate reduction of glare or if glare has been reduced then it is at the expense of a worse hazard, the reduction of vision generally at a time when the maximum of vision is most required. Such prior expedients as directing an area of light across the surface of the windshield or providing tinted glass or other vision obstructing means are not, therefore, an adequate answer to the problem.

The present invention, accordingly, has for its principal object the provision of means adapted simply and effectively to combat the headlight glare problem during night time driving. More particularly, it is an object to provide eyeglasses or other devices for direct association with the eyes of a vehicle operator which are adapted to condition the eyes against sensitivity to glare and which in no manner impede or obstruct the operator's vision.

In its specific aspects, the invention contemplates the provision of eyeglasses or other devices for ready application and direct association with the eyes of a vehicle operator which devices carry as a preformed or additive part thereof a luminescent material to which the eyes are exposed whereby to maintain the eyes, while in an atmosphere of darkness, in an adjusted or preconditioned state for abrupt accommodation to the glare of approaching headlights.

Eye devices provided in accordance with the invention further have the advantage of contributing a pleasing and comforting sensation to the user during periods of night time vehicle driving.

As another advantage, corrective lens eyeglasses when equipped with the improvements of the present invention may be worn and used in the day time or in other presence of surrounding light without the user's notice of their luminescent character which becomes effective only when required under conditions of darkness.

Other objects and advantages of the invention will be apparent from the following detailed description taken in conjunction with the accompanying drawings wherein preferred embodiments of the principles of the invention have been selected for exemplification.

Figure 1:
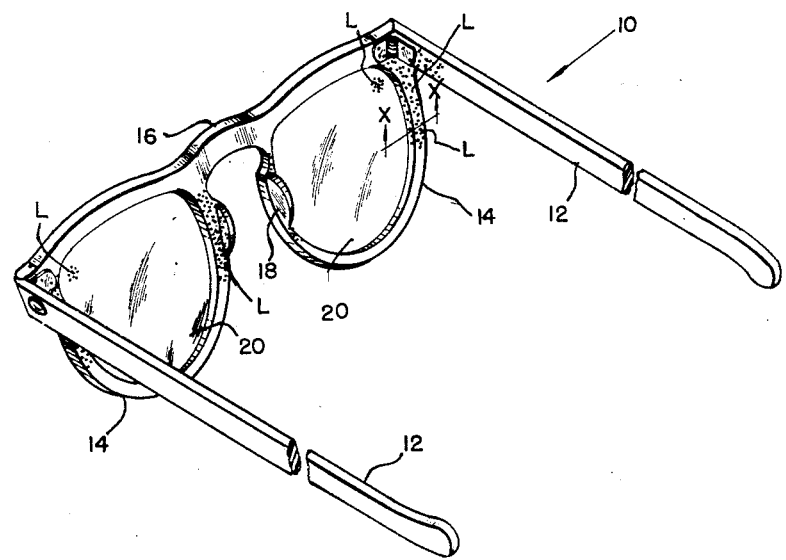
Fig. 1 is a perspective rearward view of a pair of eyeglasses constructed in accordance with the present invention.

Referring more particularly to the drawings, wherein like numerals refer to like parts, the eyeglasses indicated at 10 in Fig. 1 may be of any conventional kind and include the usual temples 12, frames 14, nose bridge 16, nose pieces 18 and lenses 20. The lenses 20 may be plano or corrective to meet the user's requirements or, insofar as the invention is concerned, the lenses may in some instances be omitted.

In accordance with the novel concept of the present invention, a luminescent material, such as a phosphorescent compound, is added to or forms a part of the eyeglasses at areas thereof, preferably outside the plane of the generally forward line of vision of the user but adjacent the eyes so that the light emanating therefrom is effective upon the eyes whereby to maintain the eyes, while in the presence of darkness, in a preconditioned state for accommodation to any abrupt glare of approaching headlights.

Figure 2:
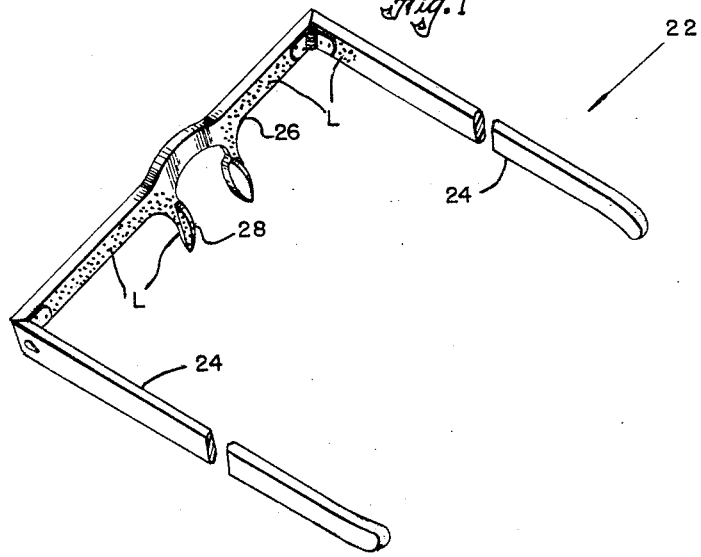
Fig. 2 is a perspective rearward view of a brow bar for use in place of eyeglasses and constructed in accordance with a modified form of the present invention.

As shown, such luminescent body indicated by stipling L may be provided along the forward inner portions of the temples 12, the inner portions of the frames 14, on the eye adjacent faces of the nose pieces 18 or on outer areas of the lenses 20. Such luminescent body may be added to eyeglasses as a coating or as a removable clip-on device or formed as an integral part thereof. The invention contemplates that the luminescent body may be provided at any selected or all of these points, the important thing being that a source of emanating light be provided adjacent to and so positioned as to act upon the eyes and of a low intensity such as to condition the eyes to exposure to light of much greater intensity but insufficient to interfere with normal night time vision or produce any uncomfortable sensation.

Where lenses are not required, the principles of the invention may be embodied in a brow bar such as shown at 22 in Fig. 2. Herein, as shown, the luminescent body L may be provided at the forward portions of the temples 24 or along inner face areas of the bar 26 which extend over the eyes or on eye adjacent faces of the nose pieces 28. Here again the luminescent body may be in the form of a coating, a removable clip-on device or formed as an integral part and may be provided at all these areas or selected areas most appropriately to effect the result intended.

Figure 3:
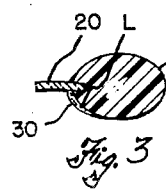
Fig. 3 is an enlarged sectional view taken on the line x—x of Fig. 1.
Figure 4:
Fig. 4 is a view similar to Fig. 3 showing a modified form of the invention.
Figure 5:
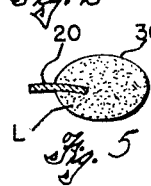
Fig. 5 is a view similar to Fig. 3 showing another modified form of the invention.
Figure 6:
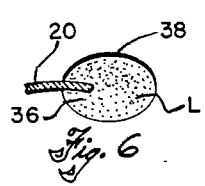
Fig. 6 is a view similar to Fig. 3 showing a further modified form of the invention.

As indicated in Figs. 3–6, the luminescent body L may be added to or formed as a part of the eyeglasses or brow bar structure in various ways. In Fig. 3 a coating of luminescent material 30 is applied to the inner or lens supporting side of any ordinary frames 14. In Fig. 4, the luminescent material, which may be in the form of a luminous plastic molding composition, is molded in as at 32 as an integral part of the frame 34. As shown in Fig. 5, the entire frame 36 may be formed of a luminous plastic molding composition and to avoid any unusual exterior appearances the outer faces of the frames 36 may be opaqued as shown at 38 in Fig. 6. It will be understood that the various other elements of the eyeglasses 10 or brow bar 22 in addition to the frames may be formed in any of these manners or in other ways as contemplated by the invention except when the luminescent body is employed on the lens when it is most convenient to apply the same only as a coating.

The present invention resides in the broad concept as herein set forth as well as the various specific structural

I claim:

In eye frames including means for positioning the frames forwardly of the eyes of a user, the improvement for conditioning the eyes against glare perception which comprises, a luminescent body carried by said frame and exposed rearwardly of said frame whereby to emanate light toward the eyes of the user and an opaque front surface for said frame disposed forwardly of said luminescent body.

References Cited in the file of this patent

UNITED STATES PATENTS

| | | |
|---|---|---|
| 1,806,190 | Arfsten | May 19, 1931 |
| 1,936,342 | Waite | Nov. 21, 1933 |
| 2,476,340 | Wallhausen | July 19, 1949 |
| 2,490,091 | Reardon | Dec. 6, 1949 |

FOREIGN PATENTS

| | | |
|---|---|---|
| 173,567 | Austria | Jan. 10, 1953 |

OTHER REFERENCES

Plastics That Glow in the Dark, Modern Plastics, October 1948, pages 88–91.